United States Patent [19]

Hait

[11] Patent Number: 5,048,505

[45] Date of Patent: Sep. 17, 1991

[54] COOKING AND STORING APPARATUS

[75] Inventor: Paul W. Hait, Sun River, Oreg.

[73] Assignee: Pyromid, Inc., Redmond, Oreg.

[21] Appl. No.: 669,660

[22] Filed: Mar. 14, 1991

[51] Int. Cl.⁵ .............................................. F24C 1/16
[52] U.S. Cl. .................................. 126/9 R; 126/25 R
[58] Field of Search ............................ 126/25 R, 9 R

[56] References Cited

U.S. PATENT DOCUMENTS

| | | | |
|---|---|---|---|
| 1,247,806 | 11/1917 | Ferdon | 126/38 |
| 2,985,164 | 5/1961 | Imoto | 126/25 |
| 3,494,349 | 2/1970 | Allen | 126/25 |
| 3,809,051 | 5/1974 | Giroux | 126/25 |
| 4,205,652 | 6/1980 | Psarris | 126/9 R |
| 4,489,706 | 12/1984 | Hait | 126/9 R |
| 4,531,505 | 7/1985 | Hait et al. | 126/9 R |
| 4,915,090 | 4/1990 | Hait | 126/9 R |
| 4,936,285 | 6/1990 | Hait | 126/29 |
| 4,938,202 | 7/1990 | Hait | 126/9 R |

FOREIGN PATENT DOCUMENTS 136398 8/1948 Australia .
1122088 4/1982 Canada .
1467646 3/1977 United Kingdom .

OTHER PUBLICATIONS

Pyromid advertising literature entitled, "Pyromid Outdoor Cooking Systems", published 1985.
Pyromid advertising literature entitled, "Pyromate 1 Stainless Steel Stove/Grill" (no date).

Primary Examiner—Carroll B. Dority
Attorney, Agent, or Firm—Jack M. Wiseman

[57] ABSTRACT

A portable apparatus that has an outdoor cooking stove mounted on a cooler. The stove is latched to the cooler to provide an assembled cooking unit and cooler for transporting and storing. When the stove is unlatched from the cooler, the stove is inverted and separated from the cooler for immediate use in the preparation of food.

16 Claims, 3 Drawing Sheets

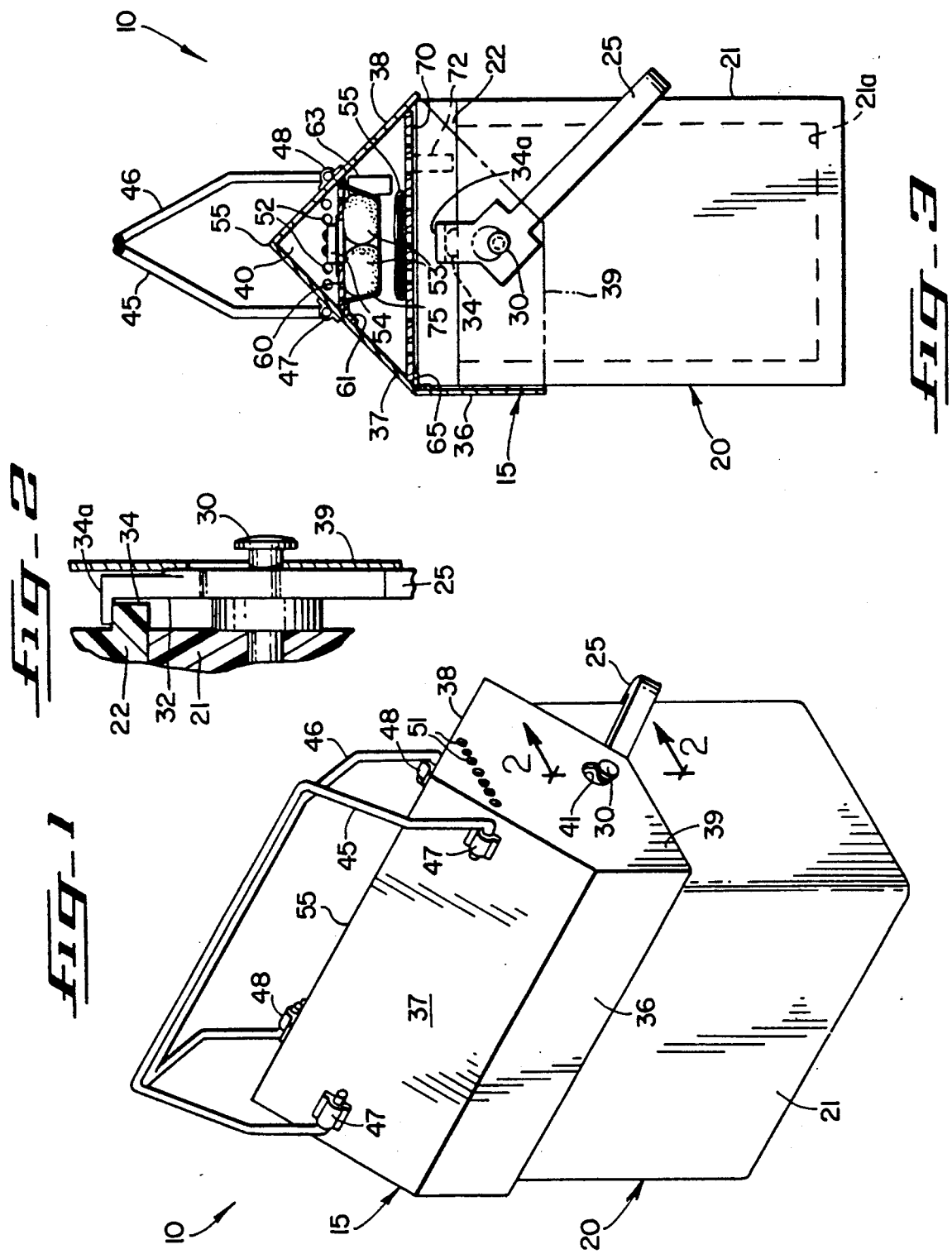

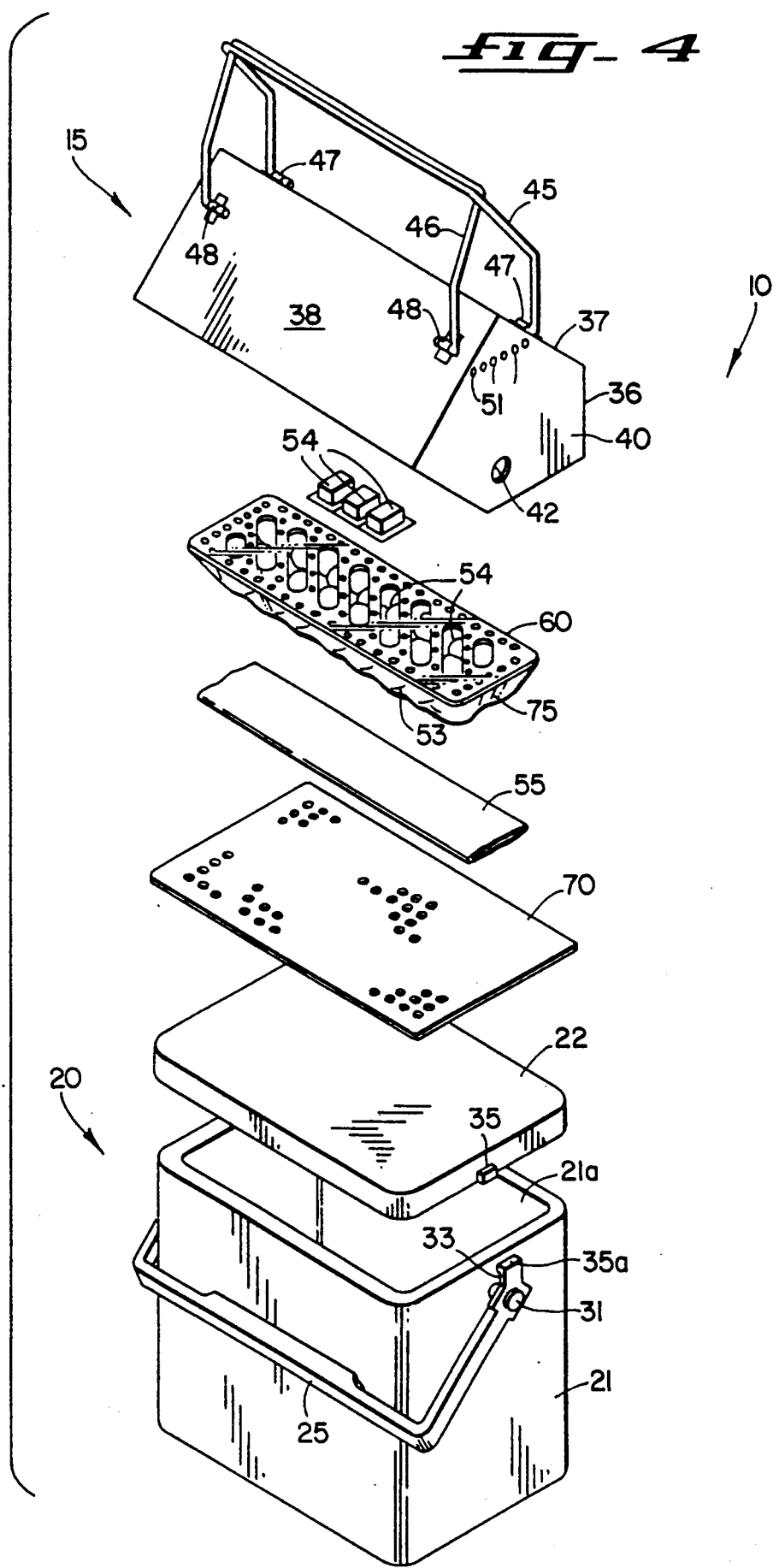

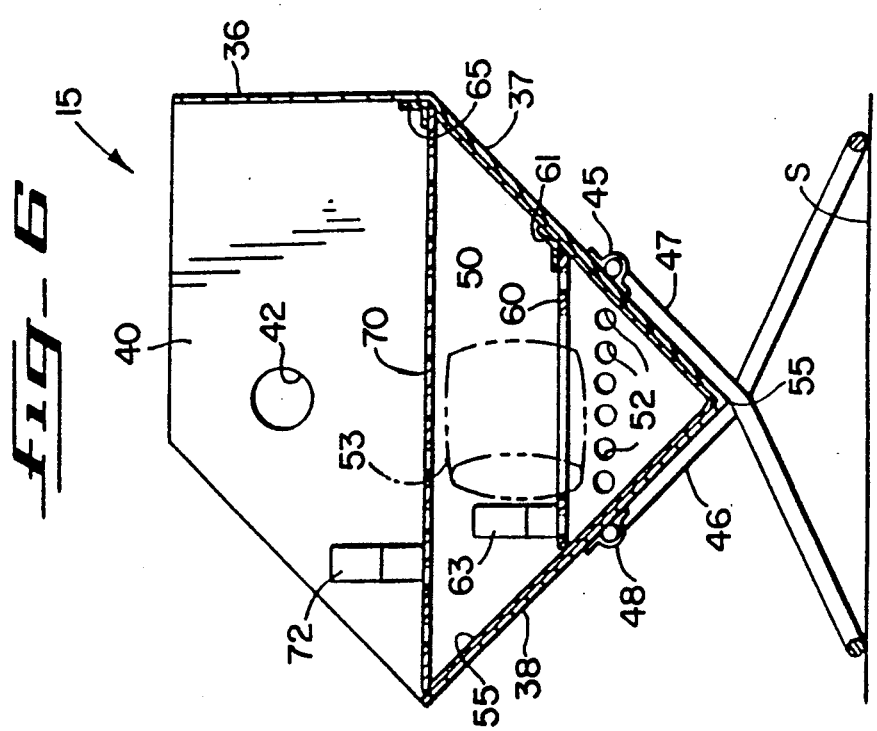
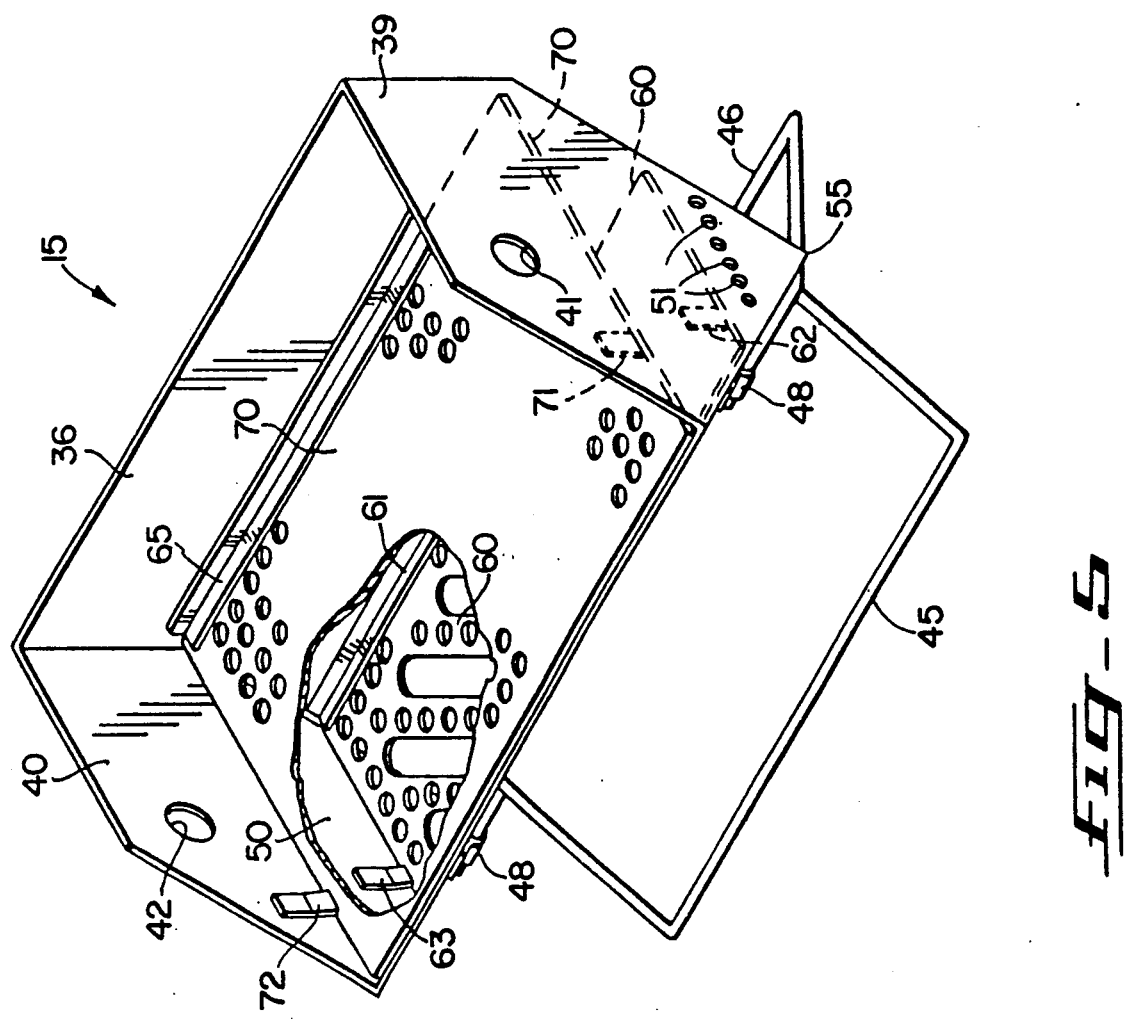

COOKING AND STORING APPARATUS

BACKGROUND OF THE INVENTION

The present invention relates in general to a cooking and storing apparatus, and more particularly to portable cooking and storing apparatus.

In the event of disasters, there is a need for an emergency survival kit that stores supplies and additionally includes a cooking unit for the preparation of food.

Heretofore, Igloo Corporation of Houston, Texas, manufactured and sold Igloo coolers capable of storing perishable foods and the like.

Pyromid, Inc. of Redmond, Oregon, has manufactured and sold a PYROMATE 1 stainless steel stove/-grill, which is a portable cooking unit having angularly disposed legs at each end thereof. The support legs have a U-shaped configuration and are pivotally connected to a truncated, pyramidal firebox support. The PYROMATE 1 stove/grill manufactured by Pyromid, Inc. fits inside the PLAYMATE ice chest manufactured by Igloo Corporation. The PYROFLECTOR cooking unit manufactured and sold by Pyromid, Inc. of Redmond, Oregon, comprises a cooking unit with angularly disposed support plates at each end thereof. The PYROBACHI oven manufactured and sold by Pyromid, Inc. of Redmond, Oregon, comprises a detachable three sided windguard disposed along the perimeter of the cooking grill.

In the Hait U.S. Pat. No. 4,915,090, issued on Apr. 10, 1990, for Reflector Stove, there is disclosed a portable cooking unit with end plates, angularly disposed, for supporting a cooking grill. The Hait U.S. Pat. No. 4,531,505, granted on July 30, 1985, for Convertible Cooking Unit With An Oven discloses a three sided, foldable windbreaker that is disposable along the perimeter of the cooking grill and is removable therefrom. In the Hait U.S. Pat. No. 4,938,202, issued on July 3, 1990, for Outdoor Cooking Unit With Disposable Component, there is disclosed a bendable, disposable and non-combustible liner disposed along the inner surface of the firebox and contoured to conform to the configuration of the interior of the firebox. The Imoto U.S. Pat. No. 2,985,164, issued on May 23, 1961, for Collapsible Camp Stove discloses a collapsible stove when assembled for transporting appears as a suitcase with a handle, and is converted to a cooking unit.

SUMMARY OF THE INVENTION

An object of the present invention is to provide a portable apparatus that is transportable as an assembled cooking unit and storage unit, and is segregated with facility as a separate cooking unit and as a separate storage unit.

A feature of the present invention is that the cooking unit is mounted on the storage unit to be transported therewith and the cooking unit is removed from the storage unit with facility and thereupon the cooking unit is inverted for immediate use.

Another feature of the present invention is that the cooking unit is mounted on the storage unit as a portable assembly with the support legs of the cooking unit serving as a handle for the portable assembly.

BRIEF DESCRIPTION OF THE DRAWINGS

FIG. 1 is a perspective view of the apparatus of the present invention illustrated as assembled.

FIG. 2 is an enlarged vertical sectional view of the apparatus shown in FIG. 1 taken along lines 2—2 of FIG. 1.

FIG. 3 is an end elevation view of the apparatus shown in FIG. 1 partially in section to show the housing of fuel and components for the cooking unit.

FIG. 4 is an exploded view of the apparatus shown in FIGS. 1 and 3.

FIG. 5 is a perspective view of the cooking unit separated from the apparatus shown in FIGS. 1 and 3 and broken away to illustrate components of the cooking unit.

FIG. 6 is an end elevation view of the cooking unit shown in FIG. 5 partially in section to illustrate the fuel and components for the cooking unit.

DETAILED DESCRIPTION OF THE PREFERRED EMBODIMENT

Illustrated in FIGS. 1 and 3 is a portable apparatus 10 embodying the present invention assembled, which assembled apparatus 10 includes a cooking unit 15 and a storage unit 20. The storage unit 20, in the preferred embodiment, is well-known cooler manufactured and sold by Igloo Corporation of Houston Texas, as the IGLOO 24. The storage unit 20, in the exemplary embodiment, comprises a housing 21 made of suitable material, such as insulation, that forms a chamber 21a for storing supplies. Additionally, the storage unit 20 includes a cover 22, which is also made of insulating material, to make the storage unit 20 suitable for storing perishables, such as food, ice or the like.

A handle 25 is pivotally attached to opposite ends of the housing 21 at the upper section thereof through oppositely directed latch buttons 30 and 31. The pivotal ends of the handle 25 are affixed to the oppositely directed latch buttons 30 and 31. When the handle 25 is in the upright position, recesses 32 and 33 thereof (FIGS. 2 and 4) receive, respectively, oppositely directed flanges 34 and 35 of the cover 22 therein to prevent the removal of the cover 22 from the housing 21. When the handle 25 is pivoted approximately forty-five degrees to confront the front or rear wall of the housing 21 at generally right angles thereto, the recesses 32 and 33 are displaced from the flanges 34 and 35, and the cover 22 is removable from the housing 21. When the handle 25 is pivoted downwardly to its fullest extent so as to engage the housing 21, flanges 34a and 35a of the handle 25 respectively engage the top of the flanges 34 and 35 of the cover 22 to prevent the removal of the cover 22 (FIGS. 2-4). When the portable apparatus 10 is assembled to be transported, the handle 25 engages either the front wall or the rear wall of the housing 21.

The cooking unit 15, in the preferred embodiment, is mounted on the storage unit 20 when the portable apparatus 10 is transported or stored. The cooking unit 15 comprises a vertical front panel 36, angularly disposed top panels 37 and 38, and side panels 39 and 40, when viewed as mounted on the storage unit 20 in the portable assembled state. The oppositely directed side panels 39 and 40 are respectively configured to join the angularly disposed top panels 37 and 38 and the vertical front panel 36.

Formed in the side panels 39 and 40, respectively, at the lower sections thereof, when the cooking unit 15 is mounted on the storage unit 20, are cylindrical openings 41 and 42. When the portable apparatus 10 is assembled and the cooking unit 15 is mounted on the storage unit 20 in a transportable state, the openings 41 and 42 receive the latch buttons 30 and 31, respectively, to detachably secure the cooking unit 15 to the storage unit 20.

Pivotally secured to the angularly disposed top panels 37 and 38, respectively, are generally U-shaped handles 45 and 46. Suitable semicylindrical bearing plates 47 and 48 secured to the angularly disposed top panels 37 and 38, respectively, journal the free ends of the legs of the U-shaped handles 45 and 46, respectively, for pivotal movement. The bearing plates 47 and 48 pivotally attach the legs of the handles 45 and 46 to the top panels 37 and 38, respectively.

To separate the cooking unit 15 from the storage unit 20, the panels 36-40 are pressed downwardly and the openings 41 and 42 are displaced from the latch buttons 30 and 31, respectively. Thereupon, the cooking unit 15 is inverted and is placed on a suitable support surface for immediate use in the preparation of food or as a heater (FIGS. 5 and 6).

When placing the cooking unit 15 on the support surface for the cooking of food or as a heater, the junction 55 of the angularly disposed panels 37 and 38 is directed downwardly. The U-shaped handles 45 and 46 are extended outwardly and downwardly from the panels 37 and 38, respectively, to provide support legs for the cooking unit 15 by engaging a supporting surface S. When the cooking unit 15 is separated from the storage unit 20 to be used in the preparation of food or as a heater, the angularly disposed panels 37 and 38, the lower sections of the side panels 39 and 40 form a firebox 50 having a trough configuration with the wide opening at the top of the trough and the apex of the trough at the junction 47. Formed in the side panels 39 and 40 are suitable openings 51 and 52, respectively, through which combustible air flows into the firebox 50. The panels 36-40, in the preferred embodiment, are made from cold roll steel. The vertical panel 36 and the upper sections of the side panels 39 and 40 form a windbreaker for the cooking unit 15.

Stored in the firebox 50, when the apparatus 10 is assembled, are suitable fuel elements, such as briquettes 53 (FIG. 3). Also stored in the firebox 50, when the apparatus 10 is assembled, are suitable and well-known solid fuel tablets 54 for igniting the fuel elements. Additionally, stored in the firebox 50, when the apparatus 10 is assembled, is a suitable metallic foil 55 for lining the walls of the firebox 50. In the preferred embodiment, the metallic foil is an aluminum foil.

Disposed within the firebox 50, when the cooking unit 15 is used for cooking, is a suitable fire grate 60, which is disposed below a lower flange 61 fixed to the angularly disposed panel 37. The fire grate engages the angularly disposed panels 37 and 38 (FIG. 6). The fire grate 60 is disposed above the openings 51 and 52 through which openings 51 and 52 combustible air flows into the firebox 50. The fire grate 60, in the preferred embodiment, is of the type disclosed in U.S. Pat. No. 4,829,975, issued on May 16, 1989, for Cooking Unit With Improved Fire Grate and in U.S. Pat. No. 4,896,650, issued on Jan. 30, 1990, for Cooking Unit With Improved Fire Grate. The fire grate 60, in the preferred embodiment, receives a narrow edge of the fuel element to support the fuel element for vertical orientation. The fuel elements are disposed in spaced relation for combustion air or gas to flow therebetween. Along the inner walls of the side panels 39 and 40, respectively, are yieldable metallic retainers 62 and 63 for holding the fire grate 60 in position (FIGS. 3, 5 and 6).

Disposed at the top section of the firebox 50 above the fire grate 60, when the cooking unit 15 is used for cooking, is an upper flange 65 under which is disposed in abutting relation a suitable cooking grill 70 (FIG. 6). The upper flange 65 is secured at the junction of the upright panel 36 and the angularly disposed panel 37. The cooking grill 70 engages the angularly disposed panels 37 and 38. Along the inner walls of the side panels 39 and 40 are yieldable metallic retainers 71 and 72 (FIGS. 3, 5 and 6) for holding the cooking grill 70 in position. The U-shaped legs 45 and 46, when the cooking unit 15 is used for cooking, are pivotally adjusted until the fire grate 60 and the cooking grill 70 are disposed in generally horizontal planes (FIGS. 5 and 6). When the cooking unit 15 is used for cooking purposes, the metallic liner 55 is unwrapped and is used to line the interior walls of the firebox 50 (FIG. 6).

While any suitable cooking grill may be employed, a rigid, stainless steel, perforated cooking grill is preferred to allow the cooking of small pieces of meat thereon. Similarly, any suitable fire grate may be employed. A fire grate made of rigid, stainless steel of the type herein disclosed is preferred.

When the cooking unit 15 is detachably secured to the storage unit 20, the fire grate 60 and the briquettes 53 and are wrapped as a bundle (FIG. 3) by suitable wrapping material 75. The solid fuel tablets 54 are wrapped in a package, which package adheres to the wrapping material 75 on the side of the fire grate 60 opposite from which are located the briquettes 53. One side edge of the wrapping material 75 seats on the flange 61 along with the adjacent side edge of the horizontally disposed fire grate 60. The yieldable metallic retainers 62 and 63 hold the wrapped bundle in position in the firebox 50. The cooking grill 70 (FIG. 3) seats on the flange 65. The yieldable metallic retainers 71 and 72 hold the cooking grill 70 in position.

What is claimed is:

1. A portable cooking and storing apparatus comprising:
   (a) a storage unit;
   (b) a cooking unit disposed on said storage unit to form a portable assembly for transporting; and
   (c) latch means between said storage unit and said cooking unit for detachably securing said cooking unit to said storage unit.

2. A portable cooking and storing apparatus as claimed in claim 1 wherein said storage unit includes a storage handle with opposite ends, said latch means including latch buttons disposed respectively at the opposite ends of said handle, said cooking unit including confronting side panels formed respectively with generally aligned openings for receiving said latch buttons respectively to detachably secure said cooking unit to said storage unit when said cooking unit is disposed on said storage unit, said side panel openings being displaced from said latch buttons to separate said cooking unit from said storage unit for providing a separate cooking unit and a separate storage unit.

3. A portable cooking and storing apparatus as claimed in claim 2 wherein said cooking unit comprises angularly disposed front and back panels joining at a junction with an open side opposite the junction therebetween, said cooking unit further comprising U-shaped members pivotally attached to said front and back panels respectively, said U-shaped members extending outwardly and downwardly from their associated front and back panels to provide support legs for said cooking unit when said cooking unit is separated from said storage unit to be used as a cooking unit, said U-shaped members extending upwardly from said front and back panels for said U-shaped members to provide a handle for said apparatus when said cooking unit is mounted on said storage unit.

4. A portable cooking and storing apparatus as claimed in claim 2 wherein said cooking unit when detached from said storage unit is inverted for use as a cooking unit separated from said storage unit, said cooking unit including angularly disposed front and rear panels joining at a junction therebetween, said angularly disposed front and rear panels and said end panels form a firebox for the separated cooking unit with the junction between said angularly disposed rear and front members forming the bottom of said firebox and said end panels and said angularly disposed front and rear panels forming an opened top opposite from the junction between said angularly disposed rear and front panels.

5. A portable cooking and storing apparatus as claimed in claim 4 wherein said cooking unit comprises U-shaped members pivotally attached to said angularly disposed front and rear panels respectively, said U-shaped members extending outwardly and downwardly from their associated angularly disposed front and rear panels to provide support legs for said cooking unit when said cooking unit is separated from said storage unit for use as a cooking unit, said U-shaped members extending upwardly from said angularly disposed front and rear panels for said U-shaped members to provide a handle for said apparatus when said cooking unit is mounted on said storage unit.

6. A portable cooking and storing apparatus as claimed in claim 4 wherein said cooking unit when used as a cooking unit comprises a fire grate disposed in said firebox, and a cooking grill disposed above said fire grate at the upper section of said firebox.

7. A portable cooking and storing apparatus as claimed in claim 5 wherein said cooking unit when used as a cooking unit comprises a fire grate disposed in said firebox, and a cooking grill dispose above said fire grate at the upper section of said firebox.

8. A portable cooking and storing apparatus as claimed in claim 4 wherein the upper sections of said side panels when used as a cooking unit extend above said cooking grill, said apparatus further comprising a rear panel extending from one of said angularly disposed panel above said cooking grill when the cooking unit is separated from said storage unit for use as a cooking unit, said upper sections of said side panels and said rear panel forming a windbreaker for said cooking unit when separated from said storage unit for use as a cooking unit.

9. A portable cooking and storing apparatus comprising:
(a) a storage unit;
(b) a cooking unit joined with said storage unit to form a portable assembly for transporting; and
(c) latch means between said storage unit and said cooking unit for detachably securing said cooking unit with said storage unit.

10. A portable cooking and storing apparatus as claimed in claim 9 wherein said latch means includes latch buttons and aligned openings for receiving said latch buttons respectively to detachably join said cooking unit and said storage unit, said latch buttons being displaced from said openings to separate said cooking unit from said storage unit for providing a separate cooking unit and a separate storage unit.

11. A portable cooking and storing apparatus as claimed in claim 9 wherein said cooking unit comprises:
(a) confronting side panels;
(b) angularly disposed front and back panels joining at a junction with an open side opposite the junction therebetween, said side panels and said front and back panels forming a storage chamber;
(c) a fuel element stored in said storage chamber; and
(d) a cooking unit element stored in said storage chamber.

12. A portable cooking and storage apparatus as claimed in claim 11 and comprising means bundling said fuel element and said cooking unit element for storage in said storage chamber.

13. A portable cooking and storing apparatus as claimed in claim 12 and comprising a first flange disposed along one of said angularly disposed panels and confronting said storage chamber for engaging the bundled fuel element and cooking unit element.

14. A cooking and storing apparatus as claimed in claim 13 and comprising a second flange vertically spaced from said first flange and supported by one of said angularly disposed panels in the vicinity of the open side of said angularly disposed panels, and a cooking grill engaging said second flange, said cooking unit element being a fire grate.

15. A portable cooking and storing apparatus as claimed in claim 1 wherein said cooking unit comprises:
(a) confronting side panels;
(b) angularly disposed front and back panels joining at a junction with an open side opposite the junction therebetween, said side panels and said front and back panels forming a chamber;
(c) a first flange disposed along one of said angularly disposed panels and confronting said chamber, said first flange having oppositely directed walls;
(d) a second flange vertically spaced from said first flange and supported by one of said angularly disposed panels in the vicinity of the open side of said angularly disposed panels and facing said chamber, said second flange having oppositely directed walls;
(e) a fire grate disposed in said chamber;
(f) a fuel element disposed in said chamber,
(g) said cooking unit when detached from said storage unit being inverted for use as a cooking unit separated from said storage unit;
(h) means for bundling said fire grate and said fuel element,
(i) said bundling means including said fire grate and said fuel element engaging one wall of said first flange when said cooking unit is disposed on said storage unit, said fire grate, when unbundled, engages an opposite wall of said first flange when said cooking unit is separated from said storage unit to be used as a cooking unit; and
(j) a cooking grill engaging one wall of said second flange when said cooking unit is disposed on said storage unit and engages an opposite wall of said second flange when said cooking unit is separated from said storage unit to be used as a cooking unit.

16. A portable cooking and storing apparatus as claimed in claim 15 wherein said cooking unit comprises:
(a) first yieldable retainers on said angularly disposed panels engaging said fire grate when said cooking unit is separated from said storage unit to be used as a cooking unit for retaining said fire grate on said first flange; and (b) second yieldable retainers on said angularly disposed panels engaging said cooking grill when said cooking unit is separated from said storage unit to be used as a cooking unit for retaining said cooking grill on said second flange.

* * * * *